Oct. 11, 1938.  W. M. RUST, JR., ET AL  2,132,807
SINGLE CABLE ELECTRICAL WELL LOGGING
Filed June 25, 1936  4 Sheets-Sheet 1

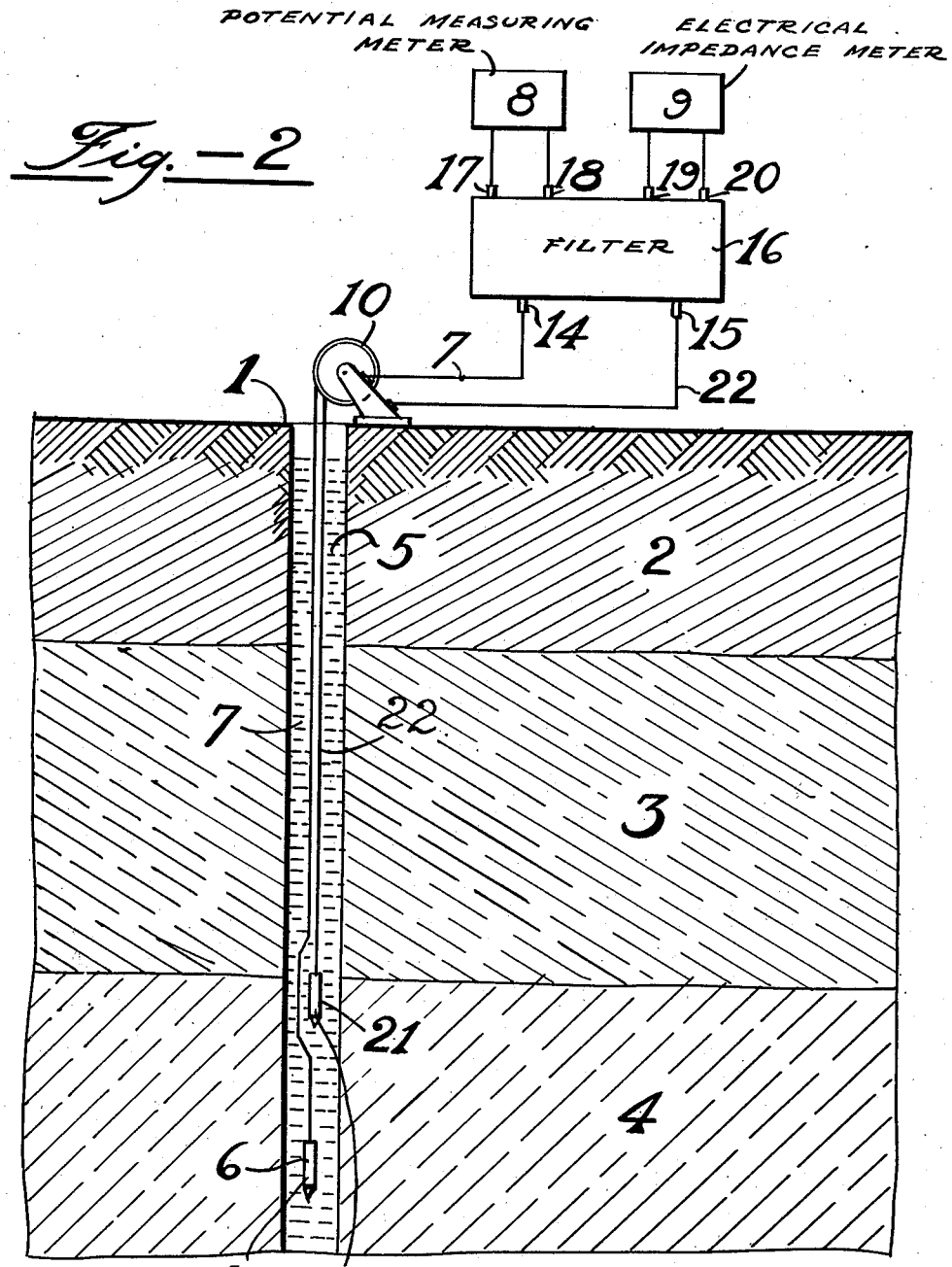

Whitman D. Mounce
William M. Rust, Jr. Inventors
By W. E. Weigester Attorney

Patented Oct. 11, 1938

2,132,807

UNITED STATES PATENT OFFICE 2,132,807

SINGLE CABLE ELECTRICAL WELL-LOGGING

William M. Rust, Jr., and Whitman D. Mounce, Houston, Tex., assignors to Standard Oil Development Company, a corporation of Delaware Application June 25, 1936, Serial No. 87,235

6 Claims. (Cl. 175—182)

This invention relates to improvements in electrical well-logging.

The object of this invention is to provide a method of measuring simultaneously and independently the natural potential difference and electrical impedance existing between two electrodes in the earth. More specifically, the method provides a means for measuring, identifying, and correlating the various earth strata penetrated by a bore hole, by which only a single pair of electrodes are used to make the customary measurements of both the natural potential difference and electrical impedance of the various earth strata between the electrodes.

The electrical impedance between a pair of electrodes in a bore hole in the earth is a quantity which is a function of the electrical properties of the material in the earth strata; namely, the conductivity, magnetic permeability and specific inductive capacity of the materials. The measurement of the quantity necessarily involves causing a current to flow through the earth between the electrodes. This current flowing through the earth produces a potential between points of the bore hole, and this potential is added to the natural potential existing between the electrodes due to the natural ground currents, and unless means are provided for either distinguishing between this undesired potential due to the applied current and the desired potential due to the natural ground current, or for making this undesired potential negligibly small in comparison to the desired potential, the potential measurements which are made will be of no value. Various means have been employed for accomplishing this desired end, but all previously known means have in common the use of a plurality of electrodes in a bore hole, each electrode being connected by means of an individual insulated conductor in the cable to the measuring device at the surface. Since the size and weight of the cable and equipment used to raise and lower the electrode must vary in almost direct proportion with the number of insulated conductors in the cable, and since for bore holes of the depth commonly employed in producing petroleum, a length of as much as 12,000 feet, or even more, of cable is necessary, it is seen that there is an advantage in reducing the number of separate insulated conductors in the cable.

This invention enables one to employ a single pair of electrodes in making the desired measurements. In practice, one electrode may be placed at the surface of the ground and a single electrode moved through the hole, this movable electrode being connected to the measuring apparatus at the surface by a single conductor; or, if preferred, both the electrodes may be attached to the end of a two conductor cable and spaced from each other by a suitable fixed distance, and the pair moved through the hole to make the desired measurements. When used in this latter manner, the conductor to one electrode may be, if preferred, the shield around an ordinary single conductor cable which is in contact with the fluid in the hole throughout its length.

This invention will be understood by the following specification and accompanying diagrams, in which latter—

Fig. 1 is a diagrammatic representation showing the invention using a single cable disposed in a bore hole.

Fig. 2 is a diagrammatic representation showing the invention applied to a bore hole in which a two-conductor cable is used.

Figure 3:
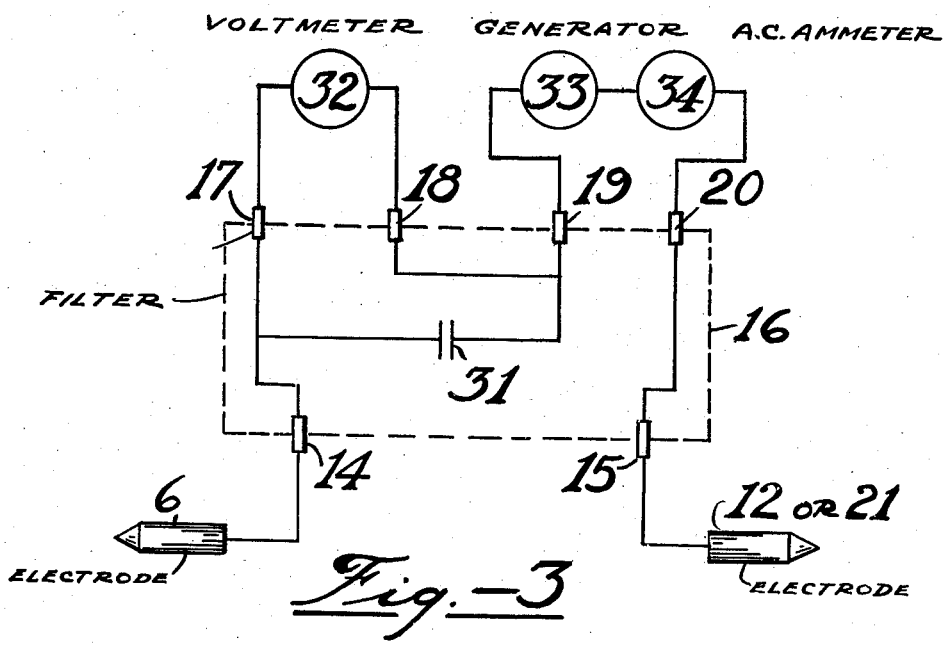
Fig. 3 shows diagrammatically a preferred form of the apparatus for carrying out the invention.

In Fig. 1, numeral 1 represents the borehole which penetrates earth strata 2, 3, 4 and the like. Numeral 5 indicates the drilling fluid in the hole and numeral 6 a metallic electrode, which is suspended in the hole and connected to the measuring apparatus by the insulated conductor 7 wound on reel 10. Numeral 12 indicates another electrode fixed at the surface of the ground. Both electrodes are connected to input terminals 14 and 15 of a filter 16, whose output terminals 17 and 18 are connected to a D. C. potential measuring device 8 and output terminals 19 and 20 to apparatus 9 for electrical impedance measurement. This impedance measuring device 9 may be any of the known impedance measuring devices, for example; a constant voltage alternating current generator and an ammeter to measure the current, a constant current alternating current generator and a voltmeter to measure the voltage across the terminals 19 and 20, the impedance measuring device of United States Patent No. 2,037,306, entitled "Method and apparatus for logging a well", issued April 14, 1936, to Ludwig W. Blau and Ralph W. Gemmer.

The term filter is used here to denote any combination of electrical elements, or electrical and mechanical elements, capable of separating the two electrical quantities.

Fig. 2 shows an arrangement in which both electrodes are attached to a two-conductor cable. In the diagram, numeral 21 is an electrode in the well which replaces electrode 12 in Fig. 1. It is connected to input terminal 15 by conductor 22, which may either be insulated or in contact with the drilling fluid 5 throughout its length. All the other numerals of Fig. 2 are applied to elements which correspond with those similarly designated in Fig. 1. In the succeeding diagrams, it is to be understood that it is optional whether input terminals 14 and 15 of the measuring apparatus are connected to electrodes disposed as shown in Fig. 1 or Fig. 2.

Figure 4:
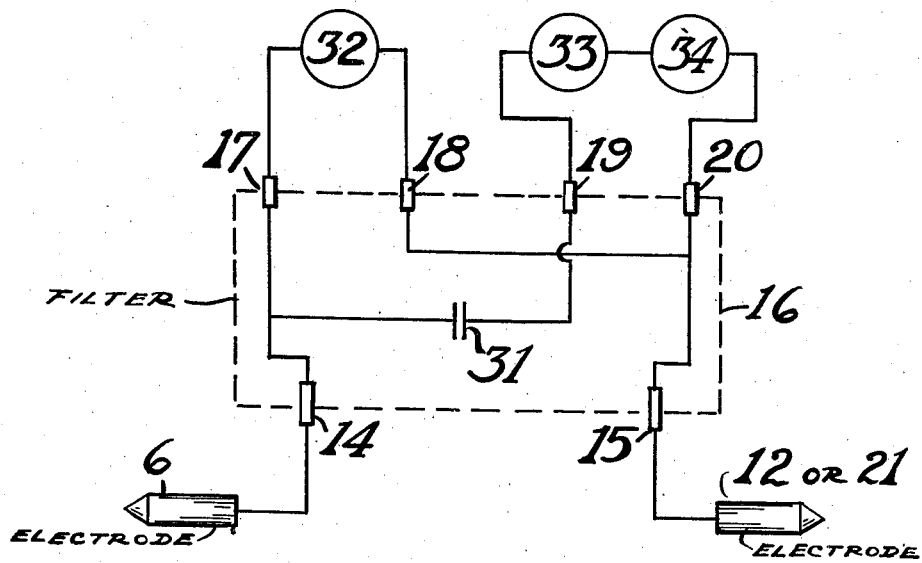
Fig. 4 is a diagrammatic representation of a modified form of apparatus for carrying out the invention.

Fig. 3 shows in more detail a preferred form of apparatus for accomplishing the purpose of the invention. Terminals 14 and 15 are connected to the electrodes in the earth. Numeral 32 represents a high resistance potential measuring device, or voltmeter, which is connected to terminals 17 and 18. Terminals 19 and 20 are connected to any impedance measuring device which makes use of an alternating current. In the diagram a preferred arrangement is shown, in which numeral 33 represents an alternating current generator, and numeral 34 an alternating current ammeter. The generator must have a low internal impedance for direct current, and be able to supply a constant alternating current voltage while the measurements are being made. In the diagram of Figs. 3 and 4, terminal 20 is connected to terminal 15, which is connected to one of the electrodes, 12 or 21. Terminal 19 is connected to terminal 14 and electrode 6 through a filter, which in the diagram is shown as a condenser 31, whose impedance is low for the alternating current supplied by the generator, but is of high impedance for the potential being measured by 8. Hence, the current indicated by 34 is determined by the impedance between the electrodes, and the potential indicated by 33 is a measurement of the potential difference between the electrodes, each measurement being substantially independent of the other.

By proper choice of elements, the behavior of the circuits shown in Figs. 3 and 4 may be made identical.

Figure 5:
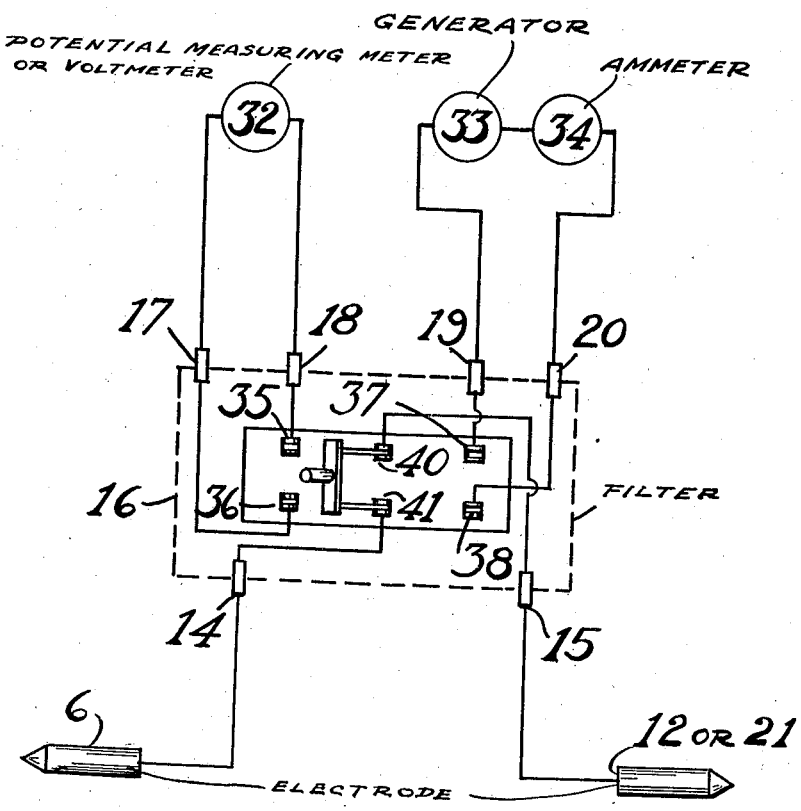
Fig. 5 is a diagrammatic representation of a suitable apparatus for making alternate measurements of potential and electrical impedance.

Fig. 5 shows means for making these measurements alternately. The movable blades of a double pole double throw switch, numerals 40 and 41, are connected to the measuring electrodes through terminals 14 and 15. The terminals 35 and 36 of the switch are connected to the potential measuring meter 32 through terminals 17 and 18, and terminals 37 and 38 are connected to the impedance measuring device comprising generator 33 and ammeter 34 through terminals 19 and 20. By throwing the switch from one position to the other, alternate measurements of potential and impedance between a single pair of electrodes may be made.

It is to be understood that if the velocity of the measuring electrode, or electrodes, which moves through the well is very high, the rate of change with time of the natural potential being measured by meter 8 may correspond to an alternating current of moderately high and varying frequency. In this event, the frequency generated for the impedance measurement is chosen to be several times as high as the frequency corresponding to the highest rate of change of the potential being measured, and filter 16, instead of simply the condenser 31, is made to be a high-pass filter of any suitable design, with a cut-off frequency lying anywhere between the impedance measuring generator frequency and the highest frequency of the potential variation.

It is also to be understood that instead of the simultaneous measurement described, certain advantages of the invention will be retained if alternate measurements of potential and electrical impedance are made. Such an arrangement involves means of switching the leads from the electrodes alternately to the impedance measuring apparatus and to the potential measuring apparatus. If this switching is accomplished mechanically or electrically with sufficient rapidity, the data so obtained will approach in usefulness that which would be obtained by simultaneous measurement of these quantities.

Various changes and alternate arrangements may be made within the scope of the appended claims, in which it is our intention to claim all novelty inherent in the invention as broadly as the prior art permits.

We claim:

1. Apparatus for logging a well, which comprises a single electrode suspended by a single conductor cable in a well, a second electrode grounded at the surface of the earth, means for passing an alternating current through the earth strata adjoining the well between the electrodes, and means for measuring simultaneously and independently the natural potential difference and electrical impedance of the earth's strata between the electrodes.

2. Apparatus for logging a well, which comprises a pair of electrodes one disposed in the well and one grounded at the surface of the earth, means for passing an alternating current through the earth between the electrodes, a filter for separating the natural D. C. potential difference between the electrodes in the earth from the generated A. C. potential means for measuring the alternating current impedance between the electrodes due to the earth's strata, and means for simultaneously and independently measuring the natural direct current potential difference existing between the electrodes.

3. Apparatus for measuring electrical properties of the earth strata penetrated by a well, which comprises a pair of electrodes in the well, means for passing an alternating current through the earth between the electrodes, a filter for separating the natural D. C. potential difference between the electrodes in the earth from the generated A. C. potential, means for measuring the impedance between the electrodes due to the earth's strata, and means for simultaneously and independently measuring the natural direct current potential difference existing between the electrodes.

4. Apparatus for logging a well which comprises a pair of electrically connected electrodes at least one of which is adapted to be suspended in the well by a single conductor cable, means for passing an alternating current through the earth between the electrodes and means associated with the electrode circuit for measuring, independently and simultaneously, the natural potential difference and the electrical impedance of the earth's strata between the electrodes.

5. An apparatus for investigating the geoelectric properties and nature of the formations traversed by a drill hole comprising; an electrode to be lowered in the hole; a single insulated conductor connecting said electrode to the surface; means at the surface for moving said electrode and said conductor in the hole; an electrical capacity, one terminal of which is connected to the said conductor and the other grounded at the surface; means for energizing by an alternating current the circuit thus formed; means for measuring the amplitude of the current caused to flow through the ground; and means for measuring, on both sides of the capacity referred to above, the differences of potential spontaneously taking place between the electrode in the hole and the electrode at the surface.

6. Apparatus for investigating the geoelectric properties and nature of the formations traversed by a drill hole comprising; an electrode adapted to be moved to different levels in the drill hole; a second electrode grounded at the surface of the soil; an electrically insulated conductor between said electrodes; means for sending a variable current through said conductor; means responsive to direct current for measuring a parameter relative to direct current flowing through said conductor due to the spontaneous difference of potential existing in the borehole where the first named electrode is immersed; and means responsive to said variable current for measuring a parameter relative to said variable current flowing through said conductor.

WHITMAN D. MOUNCE.
WILLIAM M. RUST, Jr.